(12) United States Patent
Lester et al.

(10) Patent No.: US 8,294,556 B2
(45) Date of Patent: Oct. 23, 2012

(54) POWERLINE CONTROL SYSTEM AND METHOD

(75) Inventors: Marshall Lester, Northridge, CA (US);
Preston Lane, Granada Hills, CA (US);
Ron Fienberg, Simi Valley, CA (US)

(73) Assignee: Powerline Control Systems, Inc., Northridge, CA (US)

( * ) Notice: Subject to any disclaimer, the term of this patent is extended or adjusted under 35 U.S.C. 154(b) by 1187 days.

(21) Appl. No.: 12/055,133

(22) Filed: Mar. 25, 2008

(65) Prior Publication Data
US 2008/0258882 A1 Oct. 23, 2008

Related U.S. Application Data

(60) Provisional application No. 60/912,420, filed on Apr. 17, 2007.

(51) Int. Cl.
*G08C 19/12* (2006.01)
*H03K 3/33* (2006.01)
(52) U.S. Cl. ............... 340/12.32; 340/13.23; 340/14.61; 340/14.67
(58) Field of Classification Search ............. 340/310.12, 340/310.11, 310.14; 375/239, 259; 315/224, 315/225; 363/21.03, 19
See application file for complete search history.

(56) References Cited

U.S. PATENT DOCUMENTS

| | | |
|---|---|---|
| 3,689,886 A | 9/1972 | Durkee |
| 3,689,888 A | 9/1972 | Wootton |
| 4,060,735 A | 11/1977 | Pascucci et al. |
| 4,218,655 A | 8/1980 | Johnston et al. |
| 4,264,960 A | 4/1981 | Gurr |
| 4,291,236 A | 9/1981 | Patton |
| 4,300,126 A | 11/1981 | Gajjar |
| 4,328,482 A | 5/1982 | Belcher et al. |
| 4,329,678 A | 5/1982 | Hatfield |
| 4,367,455 A | 1/1983 | Fried |
| 4,398,178 A | 8/1983 | Russ et al. |
| 4,400,688 A | 8/1983 | Johnston et al. |
| 4,567,511 A | 1/1986 | Smith et al. |
| 4,658,241 A | 4/1987 | Torre |
| 4,716,409 A | 12/1987 | Hart et al. |
| 4,963,853 A | 10/1990 | Mak |
| 4,996,513 A | 2/1991 | Mak et al. |
| 5,005,187 A | 4/1991 | Thompson |
| 5,007,042 A | 4/1991 | Santi |

(Continued)

OTHER PUBLICATIONS

World Intellectual Property Organization/Patent Cooperation Treaty, International Search Report for PCT/US08/6024, dated Jul. 7, 2008, 1 page.

*Primary Examiner* — Nam V Nguyen
(74) *Attorney, Agent, or Firm* — Lewis Brisbois; Bisgaard & Smith LLP; Jon E. Hokanson (57) ABSTRACT

Circuits and methods for transmission of digital data between two or more devices via powerline particularly suited for use in high attenuation, high noise commercial/industrial powerline environments, including transmission of pulses generated by a capacitor charged in the positive half cycle of the sine wave and discharged during the negative half-cycle, placing the pulse at one of two predetermined signal timing positions related to zero voltage crossing points or to previously transmitted pulses so that the pulses are substantially in the powerline temporal quiet zone near zero crossing and so that the powerline voltage at the time of the pulse is additive to the capacitor voltage.

47 Claims, 3 Drawing Sheets

U.S. PATENT DOCUMENTS

| | | |
|---|---|---|
| 5,264,823 A | 11/1993 | Stevens |
| 5,614,811 A | 3/1997 | Sagalovich et al. |
| 5,691,691 A | 11/1997 | Merwin et al. |
| 5,748,671 A | 5/1998 | Sutterlin et al. |
| 5,920,253 A | 7/1999 | Laine |
| 5,933,072 A | 8/1999 | Kelley |
| 6,452,817 B1 * | 9/2002 | Yasumura .................. 363/21.03 |
| 6,496,104 B2 * | 12/2002 | Kline ............................ 375/259 |
| 6,694,439 B2 * | 2/2004 | Cho et al. ...................... 713/300 |
| 6,734,784 B1 | 5/2004 | Lester |
| 6,784,790 B1 | 8/2004 | Lester |
| 6,828,740 B2 * | 12/2004 | Takahashi et al. ............ 315/291 |
| 7,265,654 B1 | 9/2007 | Lester |
| 7,405,533 B2 * | 7/2008 | Nagahama et al. ........... 318/751 |
| 2004/0101312 A1 | 5/2004 | Cabrera |
| 2008/0252430 A1 | 10/2008 | Lester |
| 2008/0258882 A1 | 10/2008 | Lester et al. |

* cited by examiner

POWERLINE CONTROL SYSTEM AND METHOD

CROSS-REFERENCE

The present application is related to and claims priority on U.S. provisional application 60/912,420, filed Apr. 17, 2007, the entirety of which is incorporated by reference herein. The present application is also related to U.S. Pat. No. 6,734,784, issued May 11, 2004, and entitled "ZERO CROSSING BASED POWERLINE PULSE POSITION MODULATED COMMUNICATION SYSTEM" ("the '784 patent"); U.S. Pat. No. 6,784,790, entitled ASYNCHRONIZATION REFERENCE PULSE BASED POWERLINE PULSE POSITION MODULATED COMMUNICATION SYSTEM, issued Aug. 31, 2004, ("the '790 patent"); and U.S. Pat. No. 7,265,654, entitled POWERLINE PULSE POSITION MODULATED TRANSMITTER APPARATUS AND METHOD, issued Sep. 4, 2007, ("the '654 patent"), all three of which patents are incorporated by reference herein.

FIELD OF INVENTION

The present systems and methods are directed to transmission of digital data between two or more devices wherein the devices are connected to the same powerline and use the same powerline to receive power and as a physical channel for electronic intercommunication and are particularly suited for use in the high attenuation, high noise commercial/industrial powerline environments. They can also be used in residential and institutional environments.

BACKGROUND

Many electrical devices may be more conveniently used if they can be remotely controlled. For example, in an industrial application, such devices are mostly HVAC and lighting loads. The HVAC and lighting loads may be remotely controlled for a number of different reasons. For energy conservation reasons, some lights may be controlled by a timer. In other cases, different lighting intensity and different lighting distribution patterns may be desirable in a single building zone, depending upon its use. Each application suggests a different lighting level and different lighting distribution and they can vary over time, such as the change of seasons and changes in daylight in a given location. Normally, changes in the control of lighting levels, and distribution and timing of lighting zones is not done, or done very infrequently because it is inconvenient or impossible to do so with conventional controls. In retrofit applications the wiring often does not allow for controlling separate zones and/or lighting levels and the cost of rewiring is often prohibitive. Therefore, it is desirable to have a convenient, reliable way to remotely control individual loads or groups of loads in commercial/industrial lighting systems without having to rewire the loads in order to produce optimum control of different groups or patterns.

In addition to lighting systems, other devices can be conveniently remotely controlled. For example, powered gates and doors can be remotely controlled. Powered window coverings may be opened and closed, depending upon available day lighting. Fans, air conditioners or evaporative coolers can be activated or controlled depending on need, instead of by the circuit to which they are connected.

As electronic technology has advanced, a variety of control systems and communication methods capable of controlling lighting and other electric loads have become known. In order to be useful as an industrial lighting control system, certain requirements of the communication system and method are important. A system must permit both small and large groups of lights to be controlled on command. One problem relates to the connection and communication between the controller and the lighting loads. For example, almost all conventional connections that can control individual fixtures or complex groups or zones of lights are hard-wired. These systems rely on some type of control wires or optical cables being run to all the fixtures being controlled. The cost of installing additional wiring to retrofit existing buildings is prohibitively expensive. Usually the cost of this type of retrofit is more than the cost of the energy to be saved, which make such a project not practical. Another disadvantage of any hard-wired system is that it may be very costly to change the configuration if the use pattern changes. For example, a manufacturing plant may change the configuration of its production zone layout every few years. Depending on how the different lighting zones are initially wired it may be impossible to match the old or original lighting zones to correspond to new or desired manufacturing and lighting zones, thereby requiring all lights to be left on 24 hours a day, for example, and thereby using energy unnecessarily. Also, while conventional, radio frequency type connection systems are known, they have proven to be difficult to implement because of FCC low signal strength level requirements. RF systems in general, and especially systems using low signal strength levels, are subject to numerous reliability problems associated with interference and attenuation. Interference and attenuation problems are much more severe in the commercial and industrial environments than in residential environments. In the United States many commercial and industrial buildings are constructed with large amounts of concrete, rebar and other metal. These materials cause significant reflection and attenuation problems for wireless communication methods. Also, the transmission and receiving circuitry for this type of control system is complex and relatively expensive. At present, there is no known widely deployed wireless industrial lighting control system.

In an electrical distribution system, both the controlling device and interface device, such as a repeating device, as well as the loads to be controlled can be connected to the same circuit(s). It therefore would be useful to use the powerline circuits as the communication-connecting channel or means. Known, prior powerline communication systems have had difficulties employing the powerline as a communication channel because, once attenuated by the powerline circuitry, the communication signals are relatively small compared to the background noise. This is particularly significant in the commercial/industrial three-phase environment. As is well known, between certain locations in an industrial electrical system application there will be very high attenuation of any transmitted signal(s). As is also well known, it has been difficult to reliably separate the highly attenuated communication signals from the background noise on the powerline, particularly in such locations. A variety of modern, energy efficient devices, such as florescent ballasts and variable-speed motor drives, cause relatively large amounts of both radio-frequency (RF) and powerline noise. This makes matters worse in a typical industrial application, such as parking structure or warehouse because there are usually very numerous loads to be controlled, and at relatively long distances. All these contribute to very difficult situation, and harsh environments for any retro-fitable RF or powerline technology. These are the primary reasons there has been no technology that has successfully addressed these problematic situations.

The above-describe attenuation problem is further aggravated and complicated by the constant and unpredictable nature of changes in the noise and signal attenuation characteristics in the powerline. These changes result as various loads are connected and disconnected both on the circuits connected to a circuit breaker panel to which the loads are connected and on the circuits connected to any of the, typically, many neighboring circuit breaker panels attached to the same mains power transformer. Since the widespread introduction of variable speed drives used for HVAC applications and the widespread introduction of many different types of electronic ballasts for lighting use, these noise and attenuation problems have become much worse due. These drives and ballasts are significant noise generators, particularly in the commercial/industrial environment. Finally, communication of control signals through the powerline circuit in an industrial application is further complicated and hindered because the powerline in an industrial building includes and is affected by all of the circuit breaker panels and all the loads attached to the mains power transformer. No known, practical way is available to avoid these complications.

SUMMARY

In one preferred embodiment, the present system and its operation are directed to an alternating half-cycle, single capacitor, single switch, pulse transmitter circuit and methods to enable powerline pulse position modulated communication that is practical and effective in the relatively harsh commercial/industrial environment.

While the presently described, alternating, half-cycle communication transmitting circuit and the operation of this circuit is particularly adapted to commercial/industrial applications, it may also be applied to conventional residential, or non-commercial, non-industrial applications. Thus, in any electrical control system that uses an alternating current powerline, the principles of the presently described systems and methods may be employed to achieve the advantages described herein and in particular to provide highly reliable electrical control system communications from one point connected to the powerline to another point connected to the same powerline.

There are very significant differences between the transmitter operation described herein, intended for use in an industrial applications and the transmitter operation described in the '784 patent, the '790 patent and the '654 patent, each of which is intended for use in a residential environment. For example the circuit in the '654 patent uses a double-transmitter, double-capacitor, double-triac, double-inductor transmission circuit in order to increase signal strength and reliability. The '654 patent circuit is considerably more complex that the transmitter circuit of the presently described system. The presently described system uses a transmission circuit having virtually half of the components and achieves greater reliability than does the circuit of the '654 patent. As will be explained in greater detail, it has been discovered that a simpler, less expensive transmission circuit with fewer components can produce much more robust communication signals than the prior art transmission circuits. The transmission circuit of the presently described invention is especially advantageous in the commercial/industrial environment where both cost and reliability are especially important. As will also be shown in greater detail a combination of relatively simpler transmission circuits and a novel method of operating the transmission circuits yield a significant increase in reliability over conventional communication methods, particularly in the industrial, three-phase powerline environment. Evolution of residential systems over many years and evolution of transmission methods from earlier systems has resulted in the presently described industrial/commercial transmission systems and methods having much greater reliability than the systems described in the '784, '790 and '654 patents, and at a cost that is less.

In accordance with the presently described system the preferred transmitting device senses all the zero voltage crossing points in the powerline and transmits a series of signal pulses, made up of data pulses, and reference pulses, if reference pulses are used, with each pulse produced at one of a predetermined set of pre-specified times or time positions on the powerline. The position of a data pulse is relative to either a zero crossing time or to the position of one or more of the starting reference pulses if reference pulses are used. The choice of which of the specified time positions each data pulse is placed in determines the digital number that the data pulse represents. This type of encoding is known as pulse position modulation and is described in greater detail in the '784, '790 and '654 patents. In pulse position modulation numerical data is encoded in the position of the pulse. It is believed that other types of codes and encoding methods could be used as embodiments of the present systems and methods, such as for example the size, shape, frequency, presence and/or absence of a pulse to encode the data. There are currently no known systems in widespread use using these other modulation possibilities for lighting control.

In the current best mode, the set of all possible predetermined pulse positions is in one or more quiet zones adjacent to, but spaced apart from the main voltage rising zero crossing point. The current best mode uses only two predetermined positions for each pulse. While use of additional predetermined positions would transmit more data more rapidly, that would decrease the reliability of the communications by making it more difficult for a receiving device to distinguish between the greater numbers of predetermined positions relative to receiving data in only two such positions. For example, if four predetermined positions are used and in which a pulse could be placed, then one and only one of four possible states or numbers could be transmitted by any one pulse. Therefore, in such a scheme only two binary bits of data could be transmitted with each pulse. Two binary bits of data represents the four states of 00, 01, 10, and 11, which are the decimal numbers 0, 1, 2, and 3. If there are sixteen predetermined positions in which a pulse could be placed, then four binary bits of data could be transmitted with each pulse. If there are only two predetermined positions, as in the current best mode embodiment, then only one binary bit of data can be transmitted with each pulse. Each pulse could represent only a 0 or a 1. Thus, a four-position scheme could transfer twice as much data per pulse as a two-position scheme. However, as shown below, problems associated with transmission and detection of pulses in a four-position scheme can in some applications render a four-position scheme to be unacceptable in comparison to a two-position scheme.

In the current best mode embodiment these data pulses and their associated digital numbers are transmitted in a series that in total can be used to make up a high level message that is part of a complex protocol and message structure. The present system relates to a lower level method of communicating numbers on the powerline with a relatively simple, inexpensive scheme that achieves a relatively highly reliable communication. The system and method are independent of the numerous ways this data transmission can be used by any of various high level message structures and protocols or different receiving circuits.

During operation of the present systems, the energy needed to produce a reference or signal pulse is stored in a capacitor. One important aspect of the current system is the choice of the half-cycle in which or during which the capacitor is charged and the half-cycle in which the capacitor is discharged. The capacitor preferably is always charged in the first half, when the voltage is rising, of a positive half-cycle. When the capacitor is discharged to produce a pulse, it is preferably discharged in the negative half-cycle following the positive half-cycle during which the capacitor is charged. The pulse is much larger if it is discharged in the following half-cycle than if it is discharged on the same half-cycle in which it is charged. This is because the voltage difference between the capacitor's charge and the line voltage is much greater on the following half-cycle, where the line voltage is negative. This difference is additive. This difference in voltage can be up to two times the peak line voltage. If the capacitor is discharged on the same half-cycle in which it is charged, then the maximum voltage difference between the capacitor voltage and the line voltage at any instant can only be one times the line peak voltage. This method and timing of the charging and discharging is an important aspect of the presently described systems and methods.

The receiving circuit also senses the approaching voltage zero crossing point and detects the signal pulse in the background of powerline noise because it has been programmed to expect and detect the signal pulse in the quiet zone adjacent to, but not exactly at the zero crossing point and because the relatively great magnitude of the reference or signal pulse, even after significant industrial attenuation. Because the data pulse is a voltage spike equal to up to two times the line voltage at the pulse discharge point or time, the pulse can be much more readily detected than if the pulse produced was smaller in relation to the line voltage at that instant.

Thus, while the receiving circuit and method are important, it will be appreciated that the production of the most reliable and therefore best transmission pulses is the primary focus of the presently described systems and methods. If a message which is made up of the largest possible transmission pulses is placed appropriately on the powerline in accordance with the present systems and methods, it is believed that one skilled in conventional electronic design could construct a receiving circuit, software and/or firmware to effectively receive the message. Receiving circuits and algorithms commercially available in Powerline Control Systems, Inc.'s existing residential Pulseworx brand systems are capable of receiving pulses produced by the present systems and methods. The choice of receiving circuit type is up to the circuit designer. The aforementioned commercially available receiver circuit uses two comparators, because that is what is available in the presently most preferred microprocessor, the Microchip PIC16F87. Depending on the microprocessor used the receiving circuit may be comprised of analog to digital units, comparators, simple on/off digital logic, input timers, relatively complex signal processing circuits, and the like. The primary intended objective of the present system is production of the best possible transmitted pulses thereby enabling the best possible communication reliability in a powerline control system.

Another reason it is very important that the capacitor is discharged in the negative half-cycle following the half-cycle during which the capacitor is charged is that this timing insures that the first wave of multiple waves that are generated by the discharge will always be in the positive direction. As is well known, when a capacitor is discharged to produce a pulse, rather than one simple pulse, a series of pulses, like ringing waves, with each wave decreasing in amplitude as the ringing continues is produced. There may be four to ten significant waves in this ringing discharge. The first wave in the discharge is almost always the largest wave. The rest of the waves generally decrease in some unpredictable and varying exponential pattern dependent on the nature of the building's electrical system at the time of discharge. In the preferred embodiment it is important that this first wave move in the positive direction. In a relatively simple, inexpensive and typical receiving circuit with only a positive power supply, the usual logic circuits, or comparator circuits or analog to digital circuits are not able to detect the negative waves of a pulse. The valid input voltages to these circuits with only a positive power supply are almost always limited to a range somewhere between ground (GND), and the positive power supply voltage (VCC). With detection of only the positive waves, it is very important that the largest wave be in the positive direction and not in the negative direction. By charging the capacitor in the positive half-cycle and discharging the capacitor in the negative half-cycle the first pulse is always in the positive direction. This is another key feature of the current systems and methods.

To produce a positive first wave the capacitor must be charged in the positive half-cycle and discharged anywhere in the negative half-cycle. It is true that the closer to the bottom of the negative valley of the sine wave, see 180 in FIG. 2, the larger the pulse voltage will be. It is also true that close to the bottom of the negative valley of the sine wave is the noisiest portion of the sine wave. For this reason there is a great advantage to discharging the capacitor in the relatively quiet period after the peak of the sine wave but before the rising zero crossing point of the sine wave. The choice of the best discharge point, see 178 in FIG. 2, in the half-cycle is a trade-off between producing a large pulse and avoiding the section with the highest powerline noise. The preferred zone, see 178 in FIG. 2, after the peak of the sine wave but before the rising zero crossing point, is relatively free from noise caused by variable speed drives, electronic ballasts and incandescent dimmers but still produces a very large pulse. It has been discovered that a corresponding zone or period close to the negative peak or negative valley of the sine wave is a very noisy area. It has been discovered that in the center of the sine wave, where the voltage is the greatest, the most powerline noise is also generated. To summarize, it has been discovered that in the center of the sine wave, where the voltage is the greatest, the most noise is generated. It has been discovered that the best compromise for the placement of the predetermined pulse positions is at a point approximately one to two milliseconds before the rising zero crossing point.

After a receiver determines in which one of the possible relative positions the signal pulse was located, the associated digital data in the form of a digital number may be determined. Thus digital data may be communicated from one device through the powerline to another device using the present systems and methods of powerline pulse position modulation.

With reference to the figures and detailed description herein, preferred specific configurations of transmitting circuits and operations of those circuits to derive transmission signals that are particularly adapted for commercial/industrial environments will be described. As such, the features of the present systems and methods described herein contribute to a communication system that is useful and advantageous in the high-attenuation, high-noise environments that very often are present in industrial environments. At present, there is no known existing powerline control system that has been widely deployed in the commercial/industrial environment, despite more than 40 years of many attempts to develop and deploy such systems. No known effort has resulted in a design that meets the cost/reliability requirements of such an application. While it is not difficult to produce a high reliability control system for an industrial environment at a high cost per node or to produce a low reliability system at a low cost per node, no relatively low cost, relatively high reliability system is known. Based on current market conditions, it is believed that the total cost of the transmitting/receiving components for a system and method of the present invention would be approximately $1-$2 per node. The transmitting circuit cost would be approximately $0.25-$0.50 per node. The term node is commonly used to define or refer to one communicating control point, such a one communicating light fixture or one communicating wall switch. These approximate costs, given above, are far lower than any other known wireless or powerline solutions.

Numerous advantages of the current system in relation to other powerline control implementations will be shown in the detailed description. In summary, those advantages include: highest pulse possible; dual capacitor not needed for strongest signal; inexpensive transmitter at high voltages; automatic charging with diode reliability; transmitter can operate at high voltages; smaller transmitter at high voltages; less power required by transmitter; no susceptibility to cross firing transmitters; uniform pulse for better receiving; no positive/negative pulse processing required; two window increased reliability; two channel split phase operation; and, simpler firmware needed.

It is a purpose and advantage of the present system to provide circuits and methods for reliable transmission of digital data over the powerline, specifically in the high noise, high attenuation, commercial/industrial environment by means of a powerline pulse position modulation communication method utilizing a novel, alternating half-cycle, single capacitor, single switch transmitter to provide much more robust communication when compared to the prior powerline pulse position modulation systems and methods of the '784, '790 and '654 patents. These prior systems have either one capacitor and one switch to produce a relatively rapid series of pulses or two capacitors and two switches to produce a more robust series of pulses.

It is a further purpose to provide for powerline pulse transmission wherein the voltage zero crossing is sensed and the communication signal pulses are transmitted in signal positions relative to either the zero crossing point or the position of one or more transmitted reference pulses.

It is a further purpose to provide powerline pulse position modulation transmissions for remote electrical load control.

It is a further purpose to provide circuits wherein the voltage zero crossing is sensed and digital pulse windows are defined with respect to the zero voltage crossing, but are spaced from the zero voltage crossing so as not to interfere with other equipment using the zero voltage crossing time.

It is a further purpose to provide powerline pulse position modulation transmission for remotely retrieving operational data from industrial loads and sensors.

It is a further purpose to provide powerline pulse position modulation transmissions for remotely controlling industrial loads for utility company energy management.

It is a further purpose to provide powerline pulse position modulation transmissions remotely controlling industrial lighting in order to meet government requirements and to save energy.

The present systems and methods, both as to organization and manner of operation, together with further objects, purposes and advantages thereof, may be best understood by reference to the following description, taken in conjunction with the accompanying drawings.

DETAILED DESCRIPTION OF PREFERRED EMBODIMENTS

Figure 1:
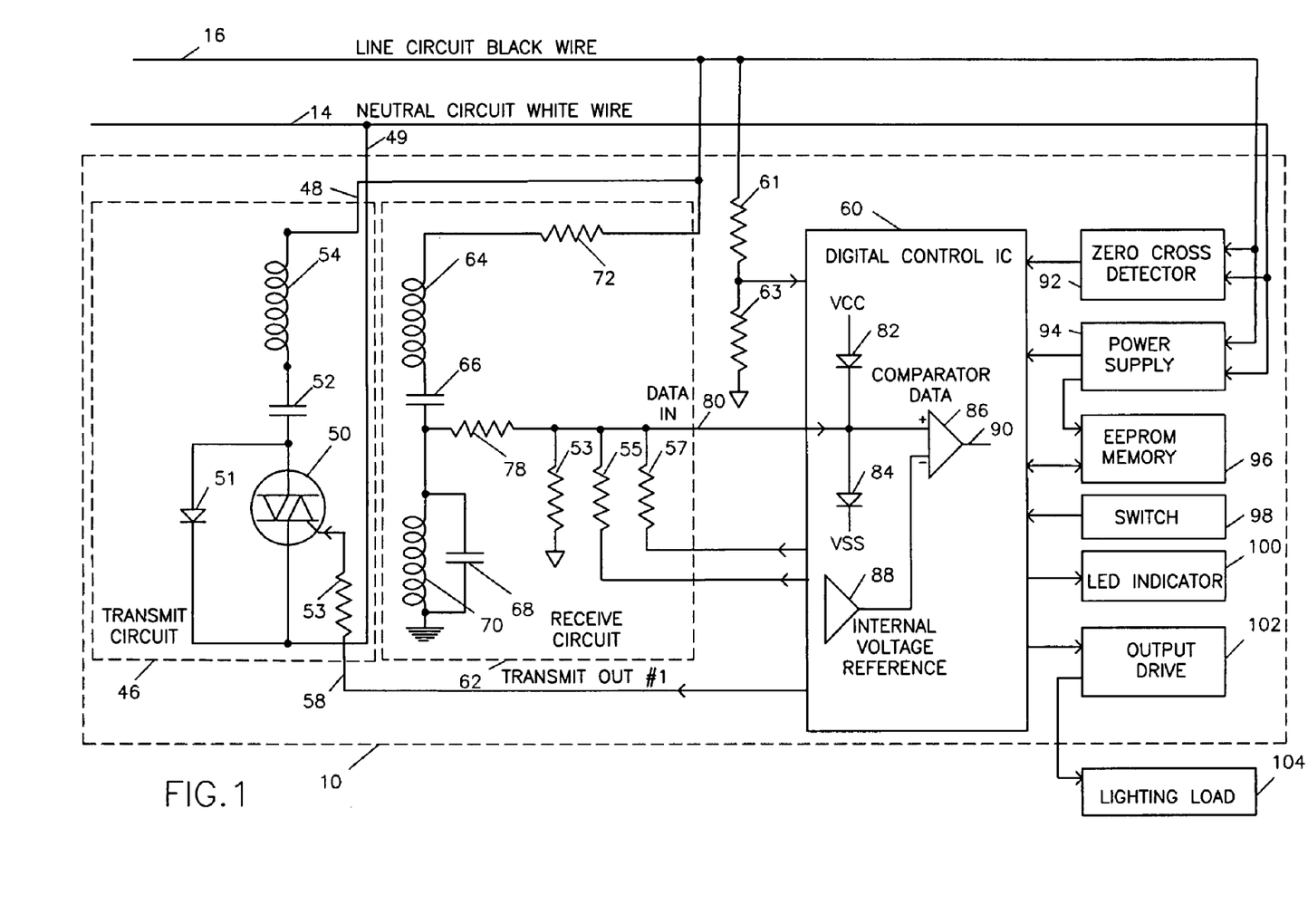
FIG. 1 is a schematic drawing of a preferred embodiment powerline pulse position modulated communication transmitter intended specifically for use in high noise, high attenuation industrial environments.

With reference to FIGS. 1-3 preferred embodiments of the present systems and methods will be described. The powerline pulse position modulated communication transmitter circuit enables communication of digital data from one device to another by means of the powerline to which both devices are connected. This digital data may then be used to control the devices, such as individual lights, motors, groups of lights, lighting zones or other electrical loads in one or more pre-designated zones within a building or designated region or area serviced by the powerline. The systems disclosed herein are particularly adapted to environments where accuracy, reliability and dependability of the control system are relatively important in comparison to the speed with which the control system operates. In contrast, the prior powerline control systems and methods of the '784, '790 and '654 patents are particularly adapted for environments where the speed with which the control system operates is relatively important, but the relative importance of extremely high reliability in severe environments is not as important. Typically, the former environments are in industrial and commercial applications whereas the latter environments are in residential applications. Nevertheless, as will be apparent to those skilled in this field, the principles of the present systems and methods may be applied in residential environments, and the principles of the inventions of the prior systems may be applied in industrial and commercial environments.

Lighting Control Application Example

There are many multi-node lighting control systems in use today with a large variety of receivers, transmitters, receiver/transmitters, load controllers, timers, etc. Many of those systems have built-in schemes and groups and zones and preset internal lighting levels stored within each lighting load control device. Some are hard-wired, some are radio frequency and some are powerline carrier based. Only systems designed and licensed by Powerline Control Systems, Inc., are believed to be powerline pulse position modulation based. Examples of these network types of lighting control systems are the Powerline Control Systems Pulseworx brand lighting system, the Lutron Radio Ra system, the Smarthome Insteon system, the Lightolier Compose system, and the Leviton Visia system. There are many designers in this field skilled in the art and who have the capability to design protocol, message structure and architecture necessary to implement these types of systems. Even though these various systems have different message structures, different protocols and different architectures it is believed all could benefit from use of the transmission systems and methods described herein. All the messages utilized by all of these control systems are comprised of strings of digital data and are conventional. Information about these systems, protocols and architectures is readily available in published documentation. The systems described herein include circuits that use a pulse position method of transmission that maximizes communication reliability and minimizes transmitter cost.

Transmission Circuit Operation

One preferred embodiment transmitter circuit is schematically illustrated in the FIG. 1 diagram, which is a modified diagram of a typical lighting control circuit. The most preferred transmitting circuit is shown by the components enclosed in the dashed line 46. The transmitting circuit 46 includes triac 50, which is connected in series with energy storage capacitor 52 and in series with the inductor 54 and a diode 51 connected in parallel with the triac. The inductor 54 functions to limit the effects of external powerline noise from false triggering of the triac and to limit the rate of change of the current when the triac discharges the capacitor.

The transmitting circuit 46 including the capacitor 52, switch 50 and inductor 54, series combination is connected to powerline 16 through line 48 and to neutral line 14 through line 49. While the triac 50 is in the off state, diode 51, preferably a model 1N4007, allows the capacitor 52 to charge completely in the positive direction by every first half, i.e., the rising half of every positive half-cycle. This is known as a simple half wave rectifying circuit. In FIG. 2 this is shown from point 176 to 180. If the capacitor is not discharged to produce a pulse it will remain in the fully charged positive state as long as power is applied. At points 172, 174, and 178 in FIG. 2B a discharge is shown.

Concerning the digital control integrated circuit, hereinafter the conventional abbreviation "IC" sometimes will be used in place of the term "digital control integrated circuit". The most preferred IC used in the FIG. 1 embodiment is a Microchip PIC16F87 microprocessor.

The IC 60 produces signal 172 that triggers triac 50 and which in turn produces pulse 178. Triac 50 is preferably a type that can be controlled directly from the 5VDC signal provided directly from the IC 60, through line 58, and which represents the output from the digital control integrated circuit. Resistor 53 in line 58 functions to limit the drive current from the IC to the triac. Many triacs, usually referred to as "Sensitive Gate Triacs", are available from a variety of semiconductor manufacturers, such as Teccor or STM, and can be directly controlled from a microprocessor. The triac used in a most preferred embodiment is the STMicroelectronics part number Z0409NF. When the IC sends an appropriate firing signal 172 at the appropriate time 174 on line 58, the triac 50 fires and places pulse 178 in line 16 with respect to the neutral 14. Immediately following production of a pulse, the next rising positive half-cycle re-charges the capacitor through diode 51. At this point the transmitter circuit is ready to produce another pulse if required to do so.

Pulse Position Modulation of Digital Data

Figure 2A:
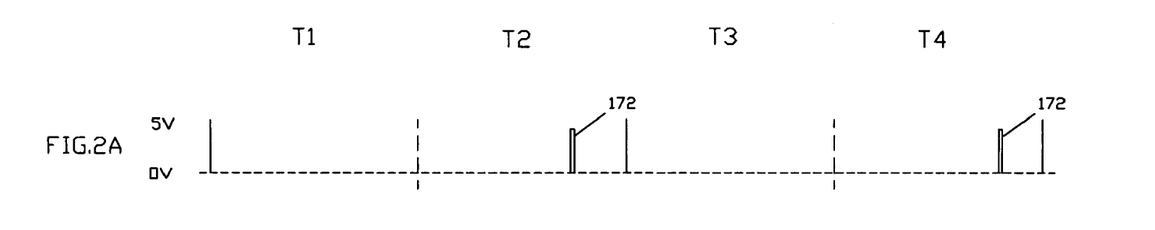
FIGS. 2A, 2B, 2C and 2D are powerline waveform diagrams showing a timing system for producing pulses and transmission positions employed by the FIG. 1 preferred embodiment.
Figure 2B:
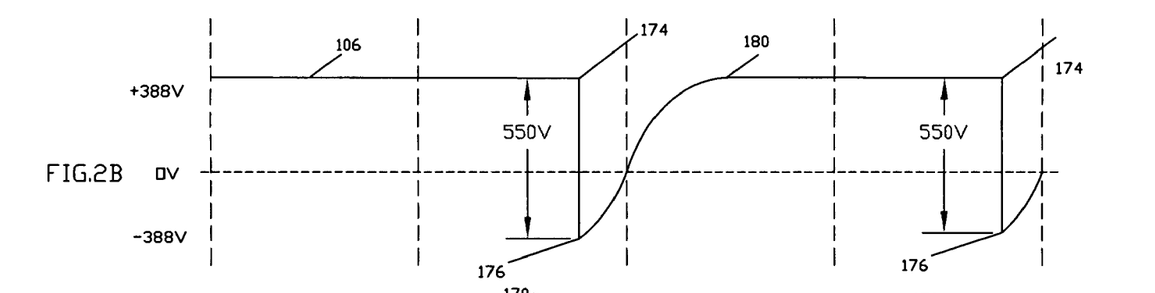
Figures 2C, 2D:
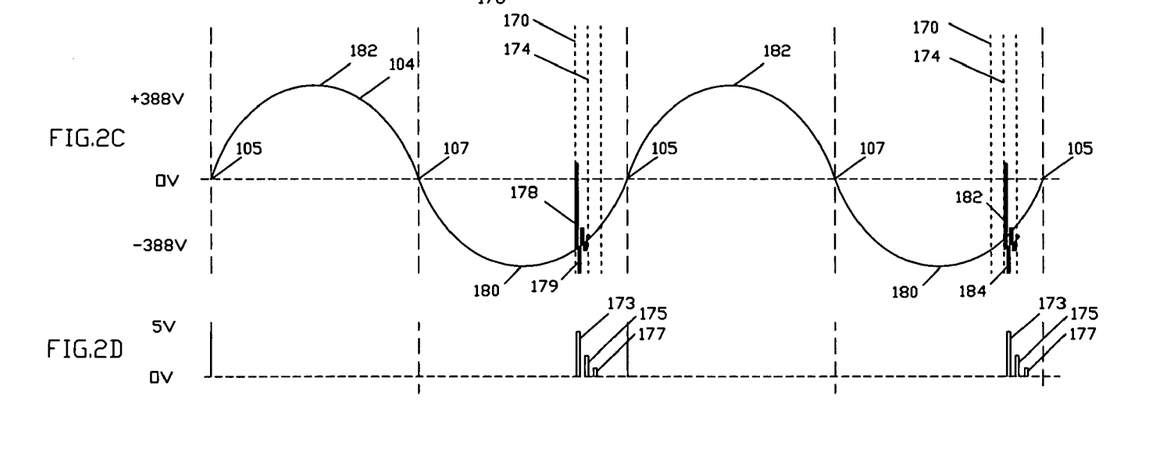

With reference to FIG. 2 the preferred alternate half-cycle, powerline control signaling of the present system will be described. Sine wave 104 represents the powerline voltage in the line 16, as compared to neutral 14. Four half-cycles are shown. For the purpose of illustrating the principles of the present invention, a powerline frequency of 60 cycles per second is chosen. This is the modern power used as the US commercial/industrial standard. Also, one phase of typical three-phase system is shown, with a nominal 277 volts rms alternating voltage, having peaks and valleys at about 388 volts, plus and minus. These are examples, and the present systems and methods can be used in other voltage, phase and frequency power systems. Taking 60 cycles per second for the purpose of illustration, because it provides a typical environment of use, each half-cycle, which is each of the intervals T1-T4, in FIGS. 2A-2D, is 8.333 milliseconds.

Transmitter Operation

As shown in FIG. 2C, the voltage through periods T1, T2, T3 and T4 is a plain sine wave. One positive zero crossing point and one negative zero crossing point are indicated at 105 and 107 respectively. The largest communication pulses are shown at 178, and provide communication from the transmitter to the load. The transmitting device places these pulses on the powerline, and the receiving devices detect these pulses on the powerline, decode the pulses into simple numeric data and then assemble all the simple numeric data into a relatively complex message comprised of a string of consecutively transmitted numeric data. This message finally controls the loads or performs one of many possible other high level functions.

In the most preferred embodiment there are two predetermined possible positions in which the pulse can be placed. A pulse can be produced only one time per negative half cycle and the pulse can be placed in only one or the other of these two possible predetermined adjacent positions, and can represent the number 0 or 1. These windows or positions are shown as 170 and 174 in FIG. 2. In the time period T2, the pulse 178 is shown placed in position 170, the "0" position, and in T4 the pulse 182 is shown placed in position 174 in the "1" position. As shown in this example, with only two possible positions used, only one bit of digital information can be transmitted during every full cycle of the AC powerline. This communication is relatively slow, but is relatively much more reliable, and is particularly well suited for harsh industrial commercial environments.

Figure 3A:
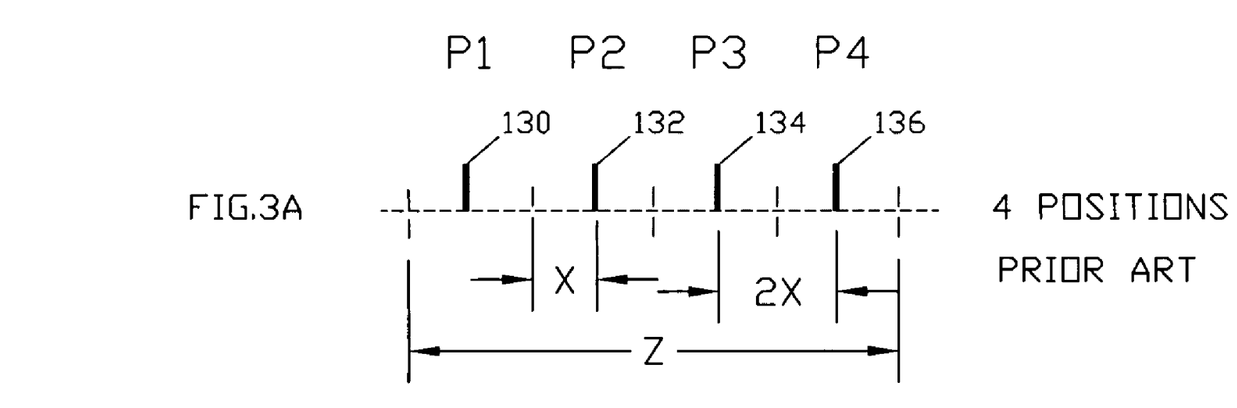
FIGS. 3A and 3B are diagrams comparing a four-position prior art signal transmission to a two-position signal transmission.
Figure 3B:
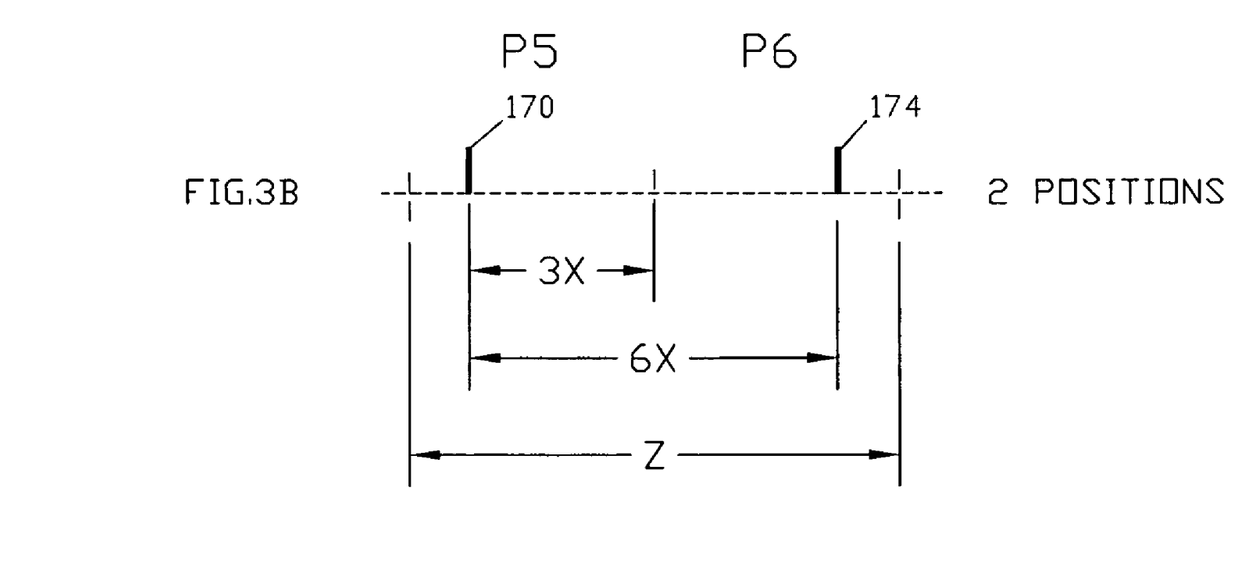

The period from 1300 µs to 500 µs before zero crossing point on the negative half-cycle is the preferred transmission period. This period is shown as Z in FIGS. 3A and 3B. FIG. 3A shows four possible transmission periods, as is used in prior residential communication designs, and FIG. 3B shows two possible transmission positions as is used in the preferred embodiment herein. The four best possible pulse positions are shown as 130, 132, 134, and 136 in FIG. 3A. The two possible pulse positions are shown as 170 and 174 in FIG. 3B. Either a four-position or a two-position scheme could be used with the current systems, but because of the higher reliability obtained the preferred embodiment uses the two-position scheme shown in FIG. 3B.

There are three known reasons for choosing the transmission time period, Z, from 1300 µs to 500 µs before the zero crossing point, to contain all the possible pulse positions. First, a relatively large pulse is generated in this period because the difference between the capacitor charged voltage and the line voltage is relatively large at this time. Second, during this period there is little interference caused by communication pulses to devices that utilize the powerline zero crossing for other purposes, such as for clocks or light dimmers. Third, during this period there is very little noise from pulse producing devices, such as light dimmers, or variable speed drives. The preferred embodiment provides a relatively simple circuit and method for greatly increasing signal strength of each transmitted pulse, which in turn results in increased overall communication reliability.

Each pulse can represent one transmitted data number. In theory the number to be transmitted can range from 1 to N where N is the total number of possible positions of any one pulse within the total transmission frame or zone Z, in FIGS. 3A and 3B. In FIG. 2C a sine wave is shown with two possible positions, 170 and 174, highlighted in each half-cycle. The use of two and only two possible pulse positions is preferred. Positions 0 and 1 are identified in FIG. 2C, as 170, and 174, respectively.

The prior powerline control residential designs utilized four positions located in the quiet zone that were spaced from, but just before zero crossing. This is shown in diagram form in FIG. 3A. The preferred embodiment utilizes only two possible pulse positions, as shown in FIG. 3B. If the total time allotted to the four positions is 800 μs then the spacing or time interval between each position relative to the next possible position in FIG. 3A will be 200 μs. This is shown as 2× in FIG. 3A. By placing a pulse in one of the possible four positions, one numeric digit, 0, 1, 2 or 3, can be transmitted every time a pulse is transmitted and received. As long as the error in receiving the pulse position is less than X, as shown in FIG. 3A, the message can be correctly received. If the error is greater than X the wrong number will be received.

In the preferred embodiment only two positions are used, as is shown in FIG. 3B. The separation or time interval between the window positions is 6× and the error caused by noise or other factors can now be up to 3× before there will be a receiving error. This represents a large increase in error avoidance, and is due to the increased space or time interval between the possible positions. With the same total space for the positions kept to a specified total time, Z, a fewer possible positions will yield increased reliability. In the pulse position method of communication two is the smallest number of possible positions.

The downside of transmitting in fewer positions is that less data are transmitted with each pulse. With only two positions, only one bit of data can be transmitted per pulse. With four possible positions, two bits of data will be transmitted with each pulse. In the preferred embodiment, where the goal is to achieve maximum communication reliability in the harsh industrial environment use of only two possible positions maximizes reliability, but sacrifices message speed.

With reference to FIG. 1 an operation of the most preferred embodiment will be described. Diode 51 keeps the capacitor 52 always charged and ready to produce a pulse. A brief trigger pulse is sent to the gate of triac 50 to discharge the capacitor and produce the pulse on the powerline. Once the triac 50 is discharged, it will be recharged by the diode 51 and be prepared to be discharged on the next cycle, as seen at 176 to 180 in FIG. 2B. When it is desired that a signal pulse be placed on the powerline, the digital control IC places a trigger pulse in line 58 to fire triac 50. These trigger pulses are shown at 172, in FIG. 2A. These pulses produce conduction in triac 50 to create the corresponding signal pulse 178, in the powerline, as shown in FIG. 2C. FIG. 2B shows the waveform of the voltage across transmitting capacitor 52 as it is charged and discharged. As shown in FIG. 2C, pulses 178 and 182 are produced every other half-cycle, preferably in the latter half of the negative half-cycles, about 1 msec before the rising zero crossing point 105.

The value of the pulse in FIG. 2B in the powerline is much greater when the capacitor is discharged in the half-cycle following the half-cycle in which the capacitor begins to be charged than when the discharging and charging take place during the same half-cycle. In the half-cycle, T2, following the charging half-cycle, T1, the powerline voltage 176 is opposite that of the capacitor voltage 174 and thus the two are additive to produce a very strong pulse signal. In FIG. 2B it is shown that this difference between 174 and 176 is approximately 550V in a 277VAC system. If the discharge took place on the same half cycle as the charge took place the maximum voltage difference between the capacitor and line would be 388V and if the discharge point was before zero crossing the voltage would be considerably less. This is one of the most fundamental features of this invention.

Also, the value of the received pulse is relatively greater when the capacitor discharge takes place during the negative half-cycle, because the larger first wave 178 of the many waves resulting from the discharge is always in the positive direction. This largest first wave is shown as 178 in FIGS. 2C and 173 in FIG. 2D. The second largest wave 179, and which is smaller than the first wave 178, is in the negative direction, but does not appear in FIG. 2D, which only shows the waves in the positive direction. Although waves at the transmitting device can be very large, the lower limit of good communication occurs when the waves at the receiving device, after being much attenuated, are very small but still clearly detectable over the noise. When the received waves are small but still detectable, they will be between 0V and 5V. The third and fifth waves in FIG. 2D, shown as 175 and 177, get progressively smaller as the energy from the pulse dissipates into the building's electrical system. If the largest first wave of the pulse was in the negative direction it would be invisible to simple receivers, because they only detect and receive positive waves. Generation of the pulses using the method of the present system always results in the first wave always propagating in the positive direction and the pulse produced always being the strongest pulse in the set of waves. These two factors contribute to producing the best possible transmitted pulses.

In accordance with the present system, the stronger or the greater the magnitude of the pulse, the easier it is reliable detection. Also, when all the pulses are relatively uniform they are more reliably detected. When the smallest of all the pulses in a chain of pulses, which is the weakest link in the chain, is still roughly equal in amplitude to the largest pulse, then the most reliable communication can be achieved. Also, when the greatest distance or time interval between possible signal positions is used then the most reliable communication can be achieved.

In the preferred embodiment of the invention, in a message transmission on each full powerline cycle one pulse may be transmitted. A pulse may be a reference pulse at the start of the message, if a reference pulse [or pulses] is used, or a data pulse following one or more reference pulses, if a reference pulse [or pulses] is used. Each data pulse will be in one of two possible temporal positions or time slots that may be referenced to zero crossing or to a previous reference or data pulse. Each of the two possible temporal positions or slots will represent a either a 0 or 1. Therefore, only the numbers 0 or 1 can be transmitted by one pulse in one cycle. A string of these pulses and derived numbers are then combined according to a high level protocol to make a complete message. The concept of transmitting digital messages as a series of digital data is well known and design of an appropriate message structure based on the transmission method described herein is within the skill of those of ordinary skill in this field.

In the preferred method of transmitting numerical data the series of transmitted numerical data is stored in the IC. If the device is a lighting controller, the data would most likely would represent lighting system addresses and command instructions. Other applications would assign other meanings for the decoded data. Some application devices, such as a powerline modem, might use the present systems and methods for pure communication of data and may not have a specific application function.

Advantages of the Present Systems and Methods

Highest Pulse Possible

The presently preferred transmitter circuits use transmission components that are triggered in such a manner as to produce communication pulses in the next negative half-cycle after the charging positive half-cycle and only on every other half-cycle so that at the time the transmission pulse is produced, only the maximum possible pulse voltage is produced. The capacitor charge voltage is additive to the line voltage with respect to zero. This produces the most robust pulse possible, one that is far greater than that which is possible if the capacitor was discharged in the same half cycle in which it was charged or if the capacitor were charged on the negative half-cycle and was discharged on positive half-cycle. In one prior system a relatively smaller pulse was produced with a capacitor charged and discharged on the same half-cycle and a pulse is produced on every half-cycle. In another prior system one relatively large and one relatively smaller pulse was produced with a capacitor charged on one half-cycle and then discharged on the following half-cycle, with two separate transmission circuits used to produce a pulse on every half-cycle. On the half-cycles in which the pulse charged on the negative half-cycle was produced, the pulse is much smaller than the pulse that was produced from the charging during the positive half-cycle. Because the "weak link in the chain" is always the smallest pulse, these smaller pulses limited the overall robustness or reliability of the system. Also this system required two independent transmitting circuits resulting in increased cost, complexity, power and circuit board space, all of which limits the value of the system in relation to the present system. One reason the current system is advantageous is that it transmits only positive going pulses that are generated in the negative half-cycle. This feature of the present systems also yields numerous other advantages that are not obvious, and that will be described below. The only known disadvantage relative to these prior systems is that the overall speed of communications is reduced; however, the degree of speed reduction is insignificant in most industrial control applications. Reliability and low per-node-cost are much more important factors than speed in industrial control applications, especially in industrial lighting control applications.

Dual Capacitor not Needed for Strongest Signal

An advantage of the present application is that the "dual-capacitor" transmitter that has been used in some prior systems is not needed in the current design. Relative to the present systems the prior dual capacitor systems are inferior because half of the time they would produce pulses that are smaller than the largest pulses. Those prior systems required two independent transmitting circuits, thus resulting in increased cost, complexity, power and circuit board space, all of which limited their value. The dual capacitor systems are at a significant disadvantage when node cost is very critical, such as in industrial control applications.

Inexpensive Transmitter at High Voltages

Because there is only one transmitter in the present systems the cost of the transmission circuitry is reduced by half. This cost is in the range of $0.25 per node and is mainly made up of one capacitor and one switching device, usually a triac. Because industrial line voltages are much higher than residential line voltages, 277VAC or 480VAC as opposed to 120VAC, the capacitor and triac voltage rating must be much higher. The size of these high voltage capacitors and triacs is also much larger than low voltage capacitors and triacs. Therefore using only one capacitor and triac is a huge advantage. The above component cost may seem like a very small amount, but in the industrial environment, where system node cost, and potential energy savings, and payback period are always a critical balance, every cent counts. The actual cost of components may be multiplied by a factor of four by the time the cost reaches the end-user. The difference between a control module costing $19 or $25 may be the difference in implementing a practical, economical, large control system or not. This difference of only a fraction of a dollar at the manufacturers cost level can result in a difference a few dollars at the user level.

Automatic Charging without Diode for Reliability

Because the transmitting capacitor in this design needs to be only charged in the positive direction it is possible to insert a simple, relatively inexpensive rectifying diode to perform this charging function. Using a single charging diode to charge the capacitor, instead of charging by means of the transmission triac, was not possible in the prior systems because of the need to charge in both directions. While a simple diode can only charge in one direction, this aspect of the current system has some very important advantages. When using a semiconductor type device, such as a triac, to charge the capacitor, three serious failure modes have been observed. In one the triac failed to turn on correctly to produce the correct charge. In another, the triac accidentally turned off before the capacitor was properly fully charged, and produced an incomplete charge. In the third the triac misfired, i.e., fired at the wrong time due to spurious noise or, more often, because of another capacitor-triac firing and producing another pulse in a dual capacitor transmission design. It has been discovered that these problems are not found in the current system, and it is believed that this is because the capacitor is always perfectly charged by the diode and is virtually always ready to be discharged by an appropriate triac or by a silicone controlled rectifier (SCR). One other related advantage is that the firmware has been simplified in relation to prior designs. The firmware in the prior microprocessor that functioned to properly "precharge" the capacitor in advance of the message transmission is preferably not used in the present system. This is because the capacitor is always perfectly charged and ready to be fired by the triac.

Transmitter can Operate at High Voltages

In the current system the capacitor is discharged only in one direction. In the prior systems the capacitor was discharged in both directions. In order for a semiconductor device to discharge the capacitor in both directions a triac must be used. If the capacitor is discharged only in one direction, an SCR may be used. An SCR is just like a triac except that it can conduct only in one direction whereas a triac can conduct in both directions. This is a small but significant difference in industrial applications. In industrial applications the voltages used are higher than voltages typically used in residential applications. Industrial lighting applications often use voltages of 277VAC, 480VAC or higher. Most triacs will not operate at such high voltages and if they will operate at such high voltages they can be very expensive. The triac or SCR used in these types of applications must be rated at two times the line peak voltage. At 480VAC RMS voltage two times the peak voltage is equal to 1344 volts. It is difficult to nearly impossible to find a commercially available triac rated at this voltage. In contrast, it is inexpensive SCRs rated at this voltage are readily available. This advantage of the current system in industrial applications is very important for a truly useful industrial communication technology that must operate at the appropriate industrial voltages.

Smaller Transmitter at High Voltages

Because a dual capacitor circuit is not needed for the current system, there is a significant conservation of circuit board space. This is very important because industrial type high voltage control devices require much greater UL safety spacings in the high voltage portions of the circuitry than spacings required in lower voltage residential devices. Some of the voltages in the transmitter circuit can reach 1400VDC. There is a great advantage to keeping the overall size of the control module as small as possible, both from a cost stand point and an application standpoint. If the control module is too large for the lighting fixture there can be serious installation problems. Another advantage is that the entire module circuitry along with the load control portion of the circuitry must be able to fit in a single gang, US wall switch or single gang US wall box controller. The single gang wall box is a standard in the United States. There are millions of control points that are limited to this form factor. If it is not possible to fit a two-way communicating "node" or controller or "smart wall switch" into a single-gang form-factor there are significant retrofit markets that cannot be addressed thereby severely limiting the value of this type of powerline control technology. With the current system two-way communication circuits and load control circuits can be designed into a standard single-gang US wall switch. Therefore, the advantage of a relatively small size transmitter even at relatively high voltages is an unexpected, but very important advantage of the current system.

Less Power Required by the Transmitter

Because no dual capacitor circuit is needed and because there is no need to charge the capacitors in both the negative and positive directions in the current systems, there is a significant reduction in the current needed to drive the transmission circuit. In the previous powerline control systems it was necessary to provide approximately 14 milliamps to charge the dual transmitter circuits. In the current system, however, the charging can be accomplished by a relatively inexpensive, relatively high voltage rectifier diode such as a 1N4007 type diode. With such a diode used for charging the capacitor, there zero charging current is needed from the device's DC power supply and only a tiny 5-20 microsecond DC pulse is needed to trigger the firing of the SCR or triac, which in turn discharges the capacitor. Because the firing pulse is only necessary for a few microseconds, the required current for firing the triac is effectively zero. This reduction in DC power supply current helps to reduce the size of the required DC power supply, which in turn minimizes both circuit board size and component costs. This is another unexpected advantage of the current systems and methods.

No Susceptibility to Cross Firing Transmitters

Because no triac is needed for charging the capacitor in the current system, there is no chance of transmitter triac misfiring during the charging phase or holding phase of operation. A simple rectifying diode cannot "misfire". The triac will always be turned ON when the line voltage is greater than the capacitor charge voltage and it will always be OFF once the line voltage drops below the capacitor charge voltage. It cannot turn ON when it is not supposed to or turn OFF before it is supposed to. In prior powerline control systems charging of the capacitor with the transmitting triac were known to cause a very difficult problem in attempts to adapt such systems to the higher voltage industrial environment. The situation was aggravated by the fact that the misfiring of triacs was also environment dependent and difficult to detect or eliminate. However, a diode cannot be accidentally turned off during charging or accidentally false triggered in the reverse direction during the holding section of the sine wave. In the prior powerline control systems, because the charging of the capacitor had to be done in both the positive direction and in the negative direction the only know way to accomplish this was by controlling the transmitting triac timing. The current systems eliminate this necessity. This is another unexpected and very important advantage of the current systems.

Uniform Pulse for Improved Receiving Capability

Because the signal pulse in the present systems are produced only in two windows or zones instead in four, as in the prior powerline control systems, the time interval between the two most separate possible pulse positions can be reduced compared to the earlier designs. The further apart the most different positions are, the greater the difference in the resulting shape and magnitude of the two pulse types. The size and shape of the pulse is related to the final charge voltage and this in turn is related to the position of firing. Small changes in position can result in small changes of pulse shape and size. Because simple receiving algorithms would assume that the size and shape of the pulses are uniform, the greater the difference in pulse size and shape the greater the loss in signal detection reliability. Thus, with only two pulses relatively close together and of very similar shape and size, signal detection in the present systems is significantly better than in the prior systems. This is another unexpected advantage of the current systems.

No Positive/Negative Pulse Processing Required

Because the signal pulse in the current systems is fired in every other half-cycle, in the positive and only in the positive direction, the pulses, which the receiver has to detect, are very uniform in shape and magnitude. In the prior powerline control systems a pulse is produced in every half-cycle, and because the alternating pulses are fired in the positive and in the negative directions the position and shape and magnitude of the pulses vary greatly in comparison. This resulted in the prior signal processing algorithms having to process and keep track of two different sets of data, signal and noise parameters, with one set of parameters for the positive half-cycles and one set of parameters for the negative half-cycles. This necessity to have two sets of receiving algorithms running simultaneously required significant time, processor code, RAM, ROM, memory and the like. The current systems design is much simpler, with only half the noise and wave shape information to be stored and processed, thereby freeing microprocessor resources for other reliability enhancing algorithms, such as more effective noise processing routines. This also allows for the use of a smaller, less expensive processor. This is another unexpected advantage of the current invention.

Two Window Increased Reliability

Because the signal pulse in the current design is produced only in two windows or zones instead of four or more windows the time interval between the closest two possible pulse positions is greatly increased. Even though the total preferred distance between the maximum and minimum window pulse positions, 600 µs, is equal to that of the prior four-window system, the distance between the 0 pulse and the 1 pulse is increased to 600 µs in the present systems. This interval is much more than the interval between any two of the prior 0, 1, 2 or 3 pulse positions, which is 200 µs. This increased interval also contributes to greatly increased communications reliability. Any of the many possible receiver designs can much more easily and successfully distinguish between the two positions used in the current systems than between each of four or more positions. This advantage and is even more important in the presence of noise in the powerline. Successful discrimination between the "0" state of the first pulse and the "1" state of the second pulse is the one of the main features contributing to the increased communications reliability of the present systems.

Two Channel Split Phase Operation

Because the signal pulse in the current systems is produced only in every other half-cycle (the negative half-cycles) instead of as in the prior powerline control systems designs where a pulse was produced in every half-cycle, it is possible to produce simple repeated messages concurrently in both phases of a split-phase 240VAC system and to produce these pulses without interaction between them. The two "phases" in a US residence are actually two 120VAC single-phase lines, taken from a center-tapped 240VAC transformer. These two "phases" are out of phase by 180 degrees, and thus are the opposite of one another. Added together they equal the 240VAC. Suppose the two phases were referred to as the A phase and the B phase. It is known that there is always some coupling between the phases within the transformer. In the prior powerline control systems this coupling within the transformer enabled messages to be transmitted through the transformer. These prior systems were configured such that a transmission would occur on both the positive and negative half-cycles and a receiver would receive this series of pulses, which occurred on all of the adjacent half-cycles. In the current systems only the negative half-cycles are used for communication. Because the negative half-cycles of the A phase in a residence correspond to the positive half-cycles of the B phase, and vice versa, effectively there are two entirely independent channels. The communication on one of the phases completely ignores the communication pulses on the other phase. This is because the signaling pulses one phase appear during the positive half cycle of the other phase. Receivers preferably are configured in the present system to always ignore any pulses on the positive half-cycles. This type of power system is very common in US residence environments and is still fairly common in the US commercial sector. This fact effectively allows the present systems to treat the positive half-cycles and the negative half-cycles as being in two completely independent phases or communication channels. This is a huge advantage for repeater processing in the residential or industrial environment. In the current systems all transmitters, receivers and repeaters only use the negative half-cycles for communication. Thereby there are two independent channels available on the two phases of the split-phase 240VAC system. This greatly simplifies the design and operation of repeaters in multi-panel 240VAC split-phase systems. In the previous powerline control systems communication pulses were transmitted and received in both the positive and negative half cycles. In those systems the two phases, A and B, in a split-phase 240VAC system are both used in any one transmission so it is not possible to use the A and B phase independently. In contrast, in the current systems the pulses are transmitted and received only on the negative half-cycle of the two A and B phases, and thus can effectively used as completely independent communication channels. This is another unexpected advantage of the current systems.

Simpler Firmware

The transmission methods of the current systems are both much simpler and use much less code space than the transmission method of the prior powerline communication systems. Because the passive diode performs the complete charging function there is no microprocessor code dedicated to this function. Also, because of the simplicity of the transmissions that always occur on the negative half cycle instead of both the positive and negative half cycles, and because of the increased magnitude of the pulses, any form of a pulse receiver can be much more simple and reliable than would otherwise be possible in the prior systems. Much less sophistication, less code space and less code development in a receiver can yield a much more reliable reception. This is an unexpected advantage of the current system and is very important because microprocessor code space is very limited in very inexpensive microprocessors. Many microprocessors in proposed wireless RF systems use 16 K or 32 K or 64 K or more of program memory for such code and use similar amounts of RAM memory. The microprocessor used in the current system uses only a few hundred bytes of RAM and about 4 K of program memory. This also contributes to why the microprocessor type used in the current system is relatively inexpensive, and in present market conditions can be purchased for less than $2US, and soon is expected to be less than $1US. This is a huge advantage in keeping the node cost to a minimum.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

The invention claimed is:

1. A powerline pulse position modulated communication transmitter comprising:
    first and second connections for connecting to an AC powerline;
    said AC powerline producing an alternating voltage consisting of a continuous series of full cycles sine waves;
    said continuous series of full cycles sine waves consisting of alternating positive half-cycle sine waves and negative half-cycle sine waves;
    a chargeable capacitor in series with a switch;
    a charging device in parallel with said switch;
    said capacitor, said charging device and said switch coupled to said first and second connections for connection in parallel to the AC powerline;
    a digital control integrated circuit;
    a zero voltage crossing detector circuit adapted to detect each zero crossing time, and coupled to at least one of said first and second AC powerline connections and to said digital control integrated circuit;
    said digital control integrated circuit adapted to charge said capacitor during said positive half-cycle; and,
    said digital control integrated circuit being coupled to said switch in series with said capacitor and adapted to actuate said switch to discharge said capacitor in said negative half-cycle following said positive half-cycle in order to produce a signal pulse on said powerline, said discharge occurring in one of a predetermined number of a plurality of predetermined signal time positions located in said negative half cycle.

2. The powerline pulse position modulated communication transmitter of claim 1 wherein said charging device is a diode adapted to permit charging of said capacitor by voltage provided by said AC powerline in the said positive first half-cycle.

3. The powerline pulse position modulated communication transmitter of claim 1 wherein said switch in series connection with said capacitor permits charging of said capacitor by voltage provided by said AC powerline in said positive first half-cycle.

4. The powerline pulse position modulated communication transmitter of claim 1 wherein a protective inductor device is in series connection with said capacitor and said switch device, and series combination of said inductor, said capacitor and said switch device are in parallel with said first and second connections for connecting to said AC powerline.

5. The powerline pulse position modulated communication transmitter of claim 1 wherein there are only two of said plurality of predetermined signal time positions located in said negative said second half cycle.

6. The powerline pulse position modulated communication transmitter of claim 1 wherein said digital control integrated circuit senses voltage zero crossing in the powerline and emits actuating signals to said switch to cause one or more reference pulses at timing positions within a predetermined time range prior to each zero crossing time.

7. The powerline pulse position modulated communication transmitter of claim 1 wherein said digital control integrated circuit emits actuating signals to said switch to cause one or more data pulses at timing positions within a predetermined time range prior to each alternating zero crossing time.

8. The powerline pulse position modulated communication transmitter of claim 1 wherein there are two predetermined signal timing positions prior to each zero crossing time.

9. The powerline pulse position modulated communication transmitter of claim 3 wherein said transmitter is one of two controller parts of a controller system, both said controller parts being connectable to the same powerline for communication there between on the powerline, said system comprising two controllers, one acting as said transmitting controller and the other acting as a receiving controller, each said transmitting controller and said receiving controller respectively containing a digital control integrated circuit and each digital control integrated circuit having a zero voltage crossing detector circuit connected thereto, and each said controller having both a transmitting circuit and a receiving circuit so that either said controller can act as a transmitting controller or as a receiving controller.

10. The powerline pulse position modulated communication transmitter of claim 9 wherein each said controller has a transmitting circuit comprised of a triac in parallel with a rectifying device serially connected to a capacitor, said serially connected triac and capacitor being coupled to the powerline, said triac being coupled to be controlled by said digital control integrated circuit; and,
   each said controller has a receive circuit comprising a filter circuit for connection to the powerline, said filter having an output signal line connected to said digital control integrated circuit so that said digital control integrated circuit can detect the timing of a signal pulses with respect to the zero voltage crossing.

11. The powerline pulse position modulated communication transmitter of claim 10 wherein a memory is connected to or an integral part of said digital control integrated circuit, said memory being programmed to define signal timing positions prior to and spaced from zero crossing so that said transmitting digital control integrated circuit can transmit a one or more reference pulses to the powerline at a selected signal timing position when acting as a transmitter, and said receiving digital control integrated circuit can determine at which signal timing position a reference signal pulse occurs when said apparatus is acting as a receiving controller.

12. The powerline pulse position modulated communication transmitter of claim 10 wherein a memory is connected to or an integral part of said digital control integrated circuit, said memory being programmed to define signal timing positions prior to and spaced from zero crossing so that said transmitting digital control integrated circuit can transmit a one or more data pulses to the powerline at a selected signal timing position related to the position of said reference pulses when acting as a transmitter, and said receiving digital control integrated circuit can determine at which signal timing position a data signal pulse occurs relative to said reference pulse when said apparatus is acting as a receiving controller.

13. The powerline pulse position modulated communication transmitter of claim 1 wherein there is an output driver connected to said digital control integrated circuit, said output driver being connectable to a load so that said output driver can be actuated to energize the load.

14. A powerline pulse position modulated communication system comprising:
   a transmitter, first and second connections for connecting said transmitter to an AC powerline, said transmitter having a zero voltage crossing detector coupled to said connections, said transmitter having a circuit for producing a series of pulses, said transmitter comprising:
   a pulse producing circuit comprising a capacitor and a switch coupled to said first and second connections, a rectifying device in parallel with said switch to charge said capacitor, said transmitter actuating said pulse producing circuits in a powerline half cycle opposite to and following the half cycle in which the capacitor finished charging so that the capacitor voltage and line voltage are added;
   a internal or external signal source connected to said circuit to actuate said transmitter circuit so as to produce one or more reference pulses in the powerline which are each in one of a plurality of predetermined signal time positions, said signal source being actuated to produce a plurality of subsequent pulses in one of said plurality of signal time positions following said reference pulse; and,
   a receiver having first and second connections for connecting to the same AC powerline, a zero voltage-crossing detector connected to said first and second connections and a circuit responsive to one or more reference pulses so that the subsequent position of each of the data pulses following the one or more reference pulses in the signal timing positions can be detected.

15. The powerline pulse position modulated communication system of claim 14 wherein said receiver has a digital control integrated circuit which senses signal pulses only at one of two predetermined timing positions within a predetermined time range close to the zero crossing time.

16. The powerline pulse position modulated communication system of claim 14 wherein there are two or more signal timing positions near zero crossing.

17. The powerline pulse position modulated communication system of claim 14 wherein both said transmitter and said receiver are structurally similar apparatuses and are connectable to the same powerline, said system comprising two of said apparatuses, one acting as a transmitting controller and the other acting as a receiving controller, each said transmitter and each said receiver respectively containing a digital control integrated circuit which can be programmed to act as a transmitting digital control integrated circuit or a receiving digital control integrated circuit, each said apparatus having a zero voltage crossing detector circuit connected therein, and each said apparatus having both a transmitting circuit and a receiving circuit so that either said apparatus can act as a transmitting controller or as a receiving controller, utilizing the same digital control integrated circuit.

18. The powerline pulse position modulated communication transmitter of claim 14 wherein said received signal pulses are received by a circuit incorporating a means for automatically adjusting the receive detection voltage level to provide automatic gain control.

19. A powerline pulse communication apparatus comprising:
   a transmitting controller and a receiving controller, said transmitting controller and said receiving controller each having connections to an alternating current powerline;
   said transmitting controller having a zero voltage crossing detector circuit with connections for connecting to the alternating current powerline, said transmitting controller having a digital control integrated circuit therein, said zero voltage crossing detector circuit having an output connected to said digital control integrated circuit;

said transmitting controller having a rectifying device in parallel connection across a switch both in series with a capacitor said rectifying device to permit charging of said capacitor by voltage provided by said powerline in the positive half cycle of the powerline voltage, and said switch to provide discharging of said capacitor in one of a predetermined number of positions in the second half of the negative half cycle of powerline voltage;

said rectifying device and capacitor having connections for coupling to the alternating current powerline so that, when said alternating current powerline is in the positive half cycle, said capacitor is charged by the alternating current powerline to a peak voltage of a positive polarity, and, said switch being connected to receive a series of trigger signals from said digital control integrated circuit, said digital control integrated circuit being programmed so that said trigger signals are timed within a predetermined time period of the powerline cycle and referenced to a prior zero crossing and said capacitor is discharged in a negative powerline half cycle so that a signal pulse is added to the powerline voltage within said predetermined time period near to but spaced from a zero crossing.

20. The powerline pulse communication apparatus of claim 19 wherein said digital control integrated circuit is programmed to turn on said switch at a time to produce one or more powerline reference pulses, each at one of a plurality of predetermined temporal positions referenced to the zero voltage crossing point.

21. The powerline pulse communication apparatus of claim 19 wherein said digital control integrated circuit is programmed to turn on said switch at a time to produce the powerline data pulses at predetermined temporal positions referenced to one or more previous reference pulse positions.

22. The powerline pulse communication apparatus of claim 19 wherein said digital control integrated circuit is programmed to turn on said switch at a time to produce the powerline data pulses at one of two of predetermined temporal positions referenced to the zero crossing position.

23. The powerline pulse communication apparatus of claim 22 wherein each of said temporal positions is approximately 600 microseconds apart.

24. The powerline pulse communication apparatus of claim 19 wherein there is a receiving controller and said receiving controller has a zero voltage crossing detector circuit and a receiving digital control integrated circuit, said zero voltage crossing detector circuit being connected to said receiving digital control integrated circuit; and, said receiving controller has a filter circuit having connections for connection to the powerlines to receive filtered powerline communication pulses superimposed therein by a transmitting controller, said filter circuit substantially filtering out signals of higher or lower frequency content than the command pulses in the powerline, said filter circuit being connected to said receiving digital control integrated circuit, said receiving digital control integrated circuit being programmed to be sensitive only to signal pulses within a predetermined time period near to but spaced from zero crossing.

25. The powerline pulse communication apparatus of claim 24 wherein said receiving digital control integrated circuit is programmed to distinguish between two or more different temporal positions within said predetermined time period near to but spaced from zero crossing.

26. The powerline pulse communication apparatus of claim 24 wherein said receiving digital control integrated circuit is programmed to distinguish between different temporal positions within said predetermined time period relative to the position of reference pulses.

27. The powerline pulse communication apparatus of claim 24 wherein said receiving digital control integrated circuit is programmed to distinguish between different temporal positions within said predetermined time period relative to the position of the zero crossing time.

28. The powerline pulse communication apparatus of claim 24 wherein there is an output controller connected to said receiving digital control integrated circuit and said output controller is for connection to the alternating current powerline and to an electrical load, said output controller turning on said load when said receiving digital control integrated circuit detects pulses in said powerline corresponding to a command to energize the load.

29. The powerline pulse communication apparatus of claim 19 wherein said transmitting digital control integrated circuit is programmed to turn on said switch at a series of times to produce a series of powerline pulses each said pulse within one of several temporal positions near to zero voltage crossing in a series of powerline cycles.

30. The powerline pulse communication apparatus of claim 29 wherein there are at least two possible temporal positions in each powerline cycle separately defined by said processor within said predetermined time period near to zero crossing.

31. The powerline pulse communication apparatus of claim 29 wherein each of said temporal positions is approximately 600 microseconds apart.

32. A powerline pulse position modulated system comprising:

a transmitter, first and second connections on said transmitter for connecting to an AC powerline, a zero voltage crossing detector connected to said first and second connections, a circuit in said transmitter for creating a pulse charge when the powerline is in a positive half cycle and for discharging the pulse charge into the powerline only when the powerline is in the negative half cycle to add a pulse into the powerline which is additive to the powerline voltage, said circuit receiving zero voltage crossing information from said zero voltage crossing detector circuit and creating a pulse in the powerline in a quiet zone window which is positioned in a predetermined quiet time period near to zero voltage crossing; and, a receiver having first and second connections for connecting to the AC powerline, a zero voltage crossing detector in said receiver connected to said first and second connections and to a control IC in said receiver, said IC being connected to the zero voltage crossing detector to receive signal pulses from the powerline within the quiet zone which is positioned in a predetermined quiet time period near to zero voltage crossing.

33. The powerline pulse position modulated communication system of claim 32 wherein said transmitter control IC and said receiver control IC are the same IC.

34. The powerline pulse position modulated communication system of claim 32 wherein said predetermined quiet time period is between about 500 microseconds and 1000 microseconds away from zero voltage crossing.

35. A powerline pulse position modulated system communication method for remotely controlling a load, comprising the steps of:

providing a transmitting controller for connection to the powerline;

sensing zero voltage crossing in the powerline;

sensing a load control command and causing the discharging of a capacitor across the powerline in one or more negative half cycle of the powerline that is opposite in polarity and each following a positive half cycle of the powerline in which said capacitor finished charging to cause transmission of one or more reference pulses related to the zero crossing sensing and the load control command;

causing the discharging of a capacitor across the powerline in a series of negative half cycles of the powerline that is opposite in polarity and each discharge following a positive half cycle of the powerline in which said capacitor finished charging to cause transmission of a series of actuating data pulses related to the position of the reference pulse and the load control command;

sensing at a receiving controller the zero voltage crossing, sensing the said one or more reference pulses, sensing the series of data pulses and determining in which signal timing positions the data pulses are located as compared to positions that the reference pulses occurred; and, actuating the load depending upon in which signal timing positions the data pulses occurred.

36. The method of claim 35 wherein the charging of the capacitor to place a pulse in the powerline is caused by a rectifying device becoming conductive.

37. The method of claim 35 wherein the discharging of the capacitor to place a pulse in the powerline is caused by a trigger pulse actuating a triac to become conductive.

38. The method of claim 37 wherein the timing of the trigger pulses to the triac is to produce the discharging of the capacitor to produce a series of powerline pulses adjacent to powerline zero crossing times which correspond to a command for load control and are related to the powerline zero crossing times.

39. The method of claim 35 wherein the timing of the trigger pulses to the triac are related to previous reference pulse times by discharging the capacitor at a series of signal positions adjacent zero crossing times which correspond to a command for load control.

40. The method of claim 35 wherein the signal timing positions are between about 500 and 1000 microseconds away from the zero crossings of the powerline voltage.

41. The method of claim 35 wherein the signal timing positions are approximately 500 microseconds apart.

42. The method of claim 35 wherein the receiving controller filters the signal out of the powerline voltage at a predetermined time period adjacent the zero crossing where the powerline is substantially quiet and delivers a series of filtered signal pulses to the digital control integrated circuit which determines at which signal timing positions said series of pulses occurred.

43. The method of claim 42 wherein the sensing at which signal timing position the series of pulses occurred is correlated with a load command to appropriately actuate a load.

44. A method of transmitting data through a powerline comprising:

providing a powerline energized with alternating electrical current, the powerline having a plurality of negative half-cycles, a plurality of positive half cycles, a plurality of zero voltage crossing points and a quite zone near to each of the zero voltage crossing points in each of the negative half-cycles;

transmitting through the powerline during only the negative half-cycles one or more electrical pulses representative of said data, each of said electrical pulses positioned in one of two specified time intervals located in each quite zone; and, said data value determined by the location of which of said specified time intervals said electrical pulse falls within.

45. A method of controlling an electrical device connected to a powerline with electrical command signals transmitted through the powerline comprising:

providing a powerline energized with electrical current, the powerline having a plurality of negative half-cycles and a plurality of zero voltage crossing points;

connecting the electrical device to the powerline, said electrical device adapted to be controlled by one or more of said command signals;

generating one or more of said command signals;

transmitting said command signals through the powerline, each of said command signals transmitted during only one of the plurality of negative half-cycles in one of two specified time windows located near each of the zero voltage crossing points;

receiving said command signals; and, controlling the device in response to receiving said command signals.

46. A commercial electrical control system comprising:

an alternating current powerline having a plurality of zero voltage crossing points;

a commercial facility supplied with electrical power from the powerline;

one or more electrical loads positioned in the commercial facility and connected to the powerline; and the electrical loads adapted to be controlled by electrical pulses transmitted through the powerline only during negative half cycles of voltage, each of said electrical pulses located in one of two specified time windows near each zero voltage crossing point.

47. A code for controlling an electrical load connected to an energized, alternating current powerline having a the form of a plain sine wave with repeating, alternating positive and negative half-cycle waves comprising;

two predetermined electrical pulse positions only on the negative half-cycle waves;

a numeric value assigned to each of the pulse positions;

an electrical pulse generator circuit adapted to generate electrical pulses and to transmit said electrical pulses through said powerline in one of said signal pulse positions, whereby each transmitted electrical pulse represents one numeric value and a series of transmitted pulses represents a series of transmitted numeric values;

said control code comprising the series of transmitted numeric values.

* * * * *